US012782182B2

(12) United States Patent
Gorai et al.

(10) Patent No.: US 12,782,182 B2
(45) Date of Patent: Nov. 3, 2026

(54) PHYSICAL QUANTITY DETECTION DEVICE FOR MEASURING MEASUREMENT TARGET GAS

(71) Applicant: HITACHI ASTEMO, LTD., Hitachinaka (JP)

(72) Inventors: Nobuaki Gorai, Hitachinaka (JP); Naoki Saito, Hitachinaka (JP); Akira Uenodan, Hitachinaka (JP); Takahiro Miki, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 259 days.

(21) Appl. No.: 18/711,164

(22) PCT Filed: Nov. 30, 2021

(86) PCT No.: PCT/JP2021/043735

§ 371 (c)(1),
(2) Date: May 17, 2024

(87) PCT Pub. No.: WO2023/100213

PCT Pub. Date: Jun. 8, 2023

(65) Prior Publication Data

US 2025/0012610 A1 Jan. 9, 2025

(51) Int. Cl.
*G01F 1/684* (2006.01)

(52) U.S. Cl.
CPC .......... *G01F 1/6842* (2013.01); *G01F 1/6847* (2013.01)

(58) Field of Classification Search
CPC .......... G01F 1/684; G01F 1/6842; G01F 5/00; G01F 1/696; G01F 1/6845; G01F 1/692;
(Continued)

(56) References Cited

U.S. PATENT DOCUMENTS 10,371,552 B2 * 8/2019 Miki ........................ G01F 15/14
11,002,617 B2 * 5/2021 Kitahara ................. G01F 1/684
(Continued)

FOREIGN PATENT DOCUMENTS

DE 10 2015 219 509 A1 4/2017
JP 2010-151795 A 7/2010
(Continued)

OTHER PUBLICATIONS

International Preliminary Report on Patentability issued in corresponding International Application No. PCT/JP2021/043735, dated Jun. 13, 2024 (5 pages).
(Continued)

*Primary Examiner* — Andre J Allen
(74) *Attorney, Agent, or Firm* — Foley & Lardner LLP

(57) ABSTRACT

A physical quantity detection device (20), which can be disposed in a main flow path (22*a*) where a measurement target gas (2) flows in one direction, includes: a circuit chamber (135*a*) that accommodates a circuit board (300); an inflow hole (220) that communicates the main flow path (22*a*) with the circuit chamber (135*a*) and allows the measurement target gas (2) flowing through the main flow path (22*a*) to flow into the circuit chamber (135*a*); an outflow hole (170) that communicates the main flow path (22*a*) with the circuit chamber (135*a*) and allows the measurement target gas (2) in the circuit chamber (135*a*) to flow out to the main flow path (22*a*); and a sensor (322) disposed in the circuit chamber (135*a*) to be at least partially located on a path (2*a*) of the measurement target gas (2) flowing from the inflow hole (220) to the outflow hole (170).

10 Claims, 15 Drawing Sheets

(58) Field of Classification Search
CPC . G01F 15/14; G01F 25/10; G01F 1/69; G01F 1/68; G01F 1/6965; G01F 1/34; G01F 1/74; G01F 1/00; G01F 1/667; G01F 1/662; G01F 15/063; G01F 1/66; G01F 1/8436; G01F 1/72; G01F 1/688; G01F 15/00; G01F 1/8413; G01F 23/284; G01F 15/185; G01F 23/00; G01F 15/024; G01F 15/022; G01F 23/263; G01F 1/8431; G01F 23/266; G01F 1/58; G01F 15/005; G01F 15/046; G01F 1/698; G01F 1/661; G01F 1/8409; G01F 1/86; G01F 23/2962; G01F 1/363; G01F 15/006; G01F 15/02; G01F 23/292; G01F 1/668; G01F 25/20; G01F 1/56; G01F 23/80; G01F 1/8477; G01F 23/268; G01F 23/804; G01F 1/6847; G01F 15/18; G01F 23/22; G01F 25/15
See application file for complete search history.

(56) References Cited

U.S. PATENT DOCUMENTS

| | | | | |
|---|---|---|---|---|
| 11,047,718 | B2 * | 6/2021 | Kitahara | G01L 19/0038 |
| 11,401,899 | B2 * | 8/2022 | Gorai | G01F 1/6842 |
| 2015/0114098 | A1 | 4/2015 | Kamiya | |
| 2017/0205261 | A1 | 7/2017 | Yogo et al. | |
| 2019/0120675 | A1 * | 4/2019 | Watanabe | G01F 5/00 |
| 2019/0323871 | A1 | 10/2019 | Uenodan et al. | |
| 2022/0155122 | A1 | 5/2022 | Ooga et al. | |

FOREIGN PATENT DOCUMENTS

| | | | | |
|---|---|---|---|---|
| JP | 2015-087254 | A | 5/2015 | |
| JP | 6395950 | B2 * | 9/2018 | G01F 1/6842 |
| JP | 2021-039025 | A | 3/2021 | |
| WO | WO-2016/017301 | A1 | 2/2016 | |
| WO | WO-2016092984 | A1 * | 6/2016 | G01F 1/684 |
| WO | WO-2018/138967 | A1 | 8/2018 | |
| WO | WO-2020/250871 | A1 | 12/2020 | |
| WO | WO-2023100213 | A1 * | 6/2023 | G01F 1/6847 |

OTHER PUBLICATIONS

International Search Report with English Translation and Written Opinion of International Patent Application No. PCT/JP2021/043735 dated Feb. 8, 2022 (10 pages).

* cited by examiner

PHYSICAL QUANTITY DETECTION DEVICE FOR MEASURING MEASUREMENT TARGET GAS

TECHNICAL FIELD

The present invention relates to a physical quantity detection device.

BACKGROUND ART

There is known a physical quantity detection device that is disposed in an intake path for an engine and measures and detects physical quantities, such as a flow rate, temperature, and humidity, of a measurement target gas (for example, air) being drawn in. For example, PTL 1 discloses a physical quantity detection device (airflow rate measurement device) in which a bypass flow path that takes in a part of air flowing inside a duct and a sub-bypass flow path that is provided to be branched off from the bypass flow path and takes in a part of air flowing through the bypass flow path are formed in a housing, and various sensors (for example, flow rate sensor, intake air temperature sensor, and humidity sensor) are disposed in the sub-bypass flow path.

CITATION LIST

Patent Literature

PTL 1: JP 2015-87254 A

SUMMARY OF INVENTION

Technical Problem

In recent years, miniaturization of a physical quantity detection device has been desired, and it has been necessary to reduce a space for disposing a sensor in a sub-bypass flow path in a housing and to reduce the number of sensors disposed in the sub-bypass flow path. An object of the present invention is to provide a compact physical quantity detection device.

Solution to Problem

To solve the above problem, the present invention is a physical quantity detection device that is configured to be disposed in a main flow path in which a measurement target gas flows in one direction, the physical quantity detection device including: a circuit chamber that accommodates a circuit board; an inflow hole that allows the main flow path and the circuit chamber to communicate with each other and allows a measurement target gas flowing through the main flow path to flow into the circuit chamber; an outflow hole that allows the main flow path and the circuit chamber to communicate with each other and allows the measurement target gas in the circuit chamber to flow out to the main flow path; and a sensor disposed in the circuit chamber to be at least partially located on a path for the measurement target gas flowing from the inflow hole to the outflow hole.

Advantageous Effects of Invention

According to the present invention, since the sensor is provided in the circuit chamber, the physical quantity detection device can be miniaturized. Problems, configurations, and effects other than those described above will be clarified by the following description of embodiments.

DESCRIPTION OF EMBODIMENTS

Figure 1:
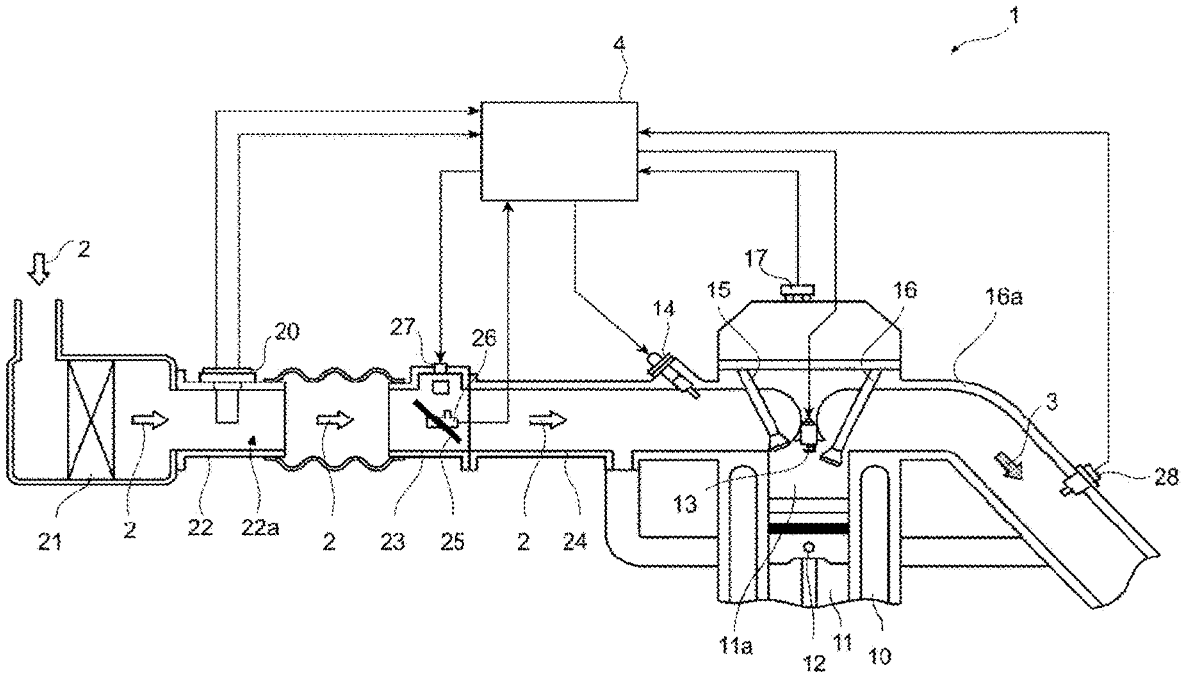
FIG. 1 is a schematic diagram of an internal combustion engine control system using a physical quantity detection device according to a first embodiment.

Hereinafter, configurations and operations of physical quantity detection devices according to first to third embodiments of the present invention will be described with reference to the drawings. In the drawings, the same reference numerals denote the same portions.

First Embodiment

FIG. 1 is a schematic diagram of an internal combustion engine control system using a physical quantity detection device according to a first embodiment. An internal combustion engine control system 1 is a control system for an internal combustion engine in which air as a measurement target gas 2 is drawn in from an air cleaner 21 based on an operation of an internal combustion engine 10 equipped with an engine cylinder 11 and an engine piston 12.

The measurement target gas 2 drawn in from the air cleaner 21 is guided to a combustion chamber 11*a* of the engine cylinder 11 via an intake body 22, a throttle body 23, and an intake manifold 24.

The physical quantity of the measurement target gas 2 guided to the combustion chamber 11*a* is detected by a physical quantity detection device 20 in a main flow path 22*a*. The measurement target gas 2 is mixed with a fuel, supplied from a fuel injection valve 14 based on that physical quantity, and is guided to the combustion chamber 11*a* as mixed air.

The mixed air guided to the combustion chamber 11*a* is explosively combusted by spark ignition of an ignition plug 13 to generate mechanical energy. Then, the gas after combustion is guided from an exhaust valve 16 to an exhaust pipe 16*a*, and is discharged as an exhaust gas 3 from the exhaust pipe 16*a* to the outside of the vehicle.

The flow rate of the measurement target gas 2 guided to the combustion chamber 11*a* is controlled by a throttle valve 25 with its opening degree changing based on an operation of an accelerator pedal. The amount of fuel supplied is controlled based on the flow rate of the measurement target gas 2 guided to the combustion chamber 11*a*. Therefore, by operating the accelerator pedal, a driver can change the opening degree of the throttle valve 25, control the flow rate of the measurement target gas 2 guided to the combustion chamber 11*a*, and change the mechanical energy generated in the internal combustion engine.

The physical quantity detection device 20 is a device that detects physical quantities, such as a flow rate, temperature, humidity, and pressure, of the measurement target gas 2 taken in from the air cleaner 21 and flowing through the main flow path 22*a* (in the present embodiment, a flow path in the intake body 22), and inputs the physical quantities to a control device 4 as electric signals.

The throttle angle sensor 26 is a sensor that detects the opening degree of the throttle valve 25 and inputs the opening degree to the control device 4 as an electric signal. Moreover, a rotation angle sensor 17 is a sensor that inputs a detection value as an electric signal to the control device 4 as the sensor detects the positions and states of the engine piston 12, the intake valve 15, and the exhaust valve 16 of the internal combustion engine, and the rotation speed of the internal combustion engine. Furthermore, an oxygen sensor 28 is a sensor that inputs a detection value to the control device 4 as an electric signal as the sensor detects a state of a mixing ratio between the amount of fuel and the amount of air from the state of the exhaust gas 3.

The control device 4 is a device that calculates the amount of fuel injected and the ignition timing based on the detection values of the physical quantity detection device 20, the throttle angle sensor 26, the rotation angle sensor 17, and the oxygen sensor 28. Based on the calculation results of the control device 4, the amount of fuel supplied from the fuel injection valve 14 and the ignition timing at which the ignition plug 13 is ignited are controlled. Moreover, to control the rotational speed of the internal combustion engine in the idle operation state, the control device 4 controls the amount of air bypassing the throttle valve 25 by the idle air control valve 27 in the idle operation state of the internal combustion engine. Therefore, the amount of fuel supplied and the ignition timing, which are the main control quantities of the internal combustion engine, are calculated by the detection value of the physical quantity detection device 20.

Figure 2:
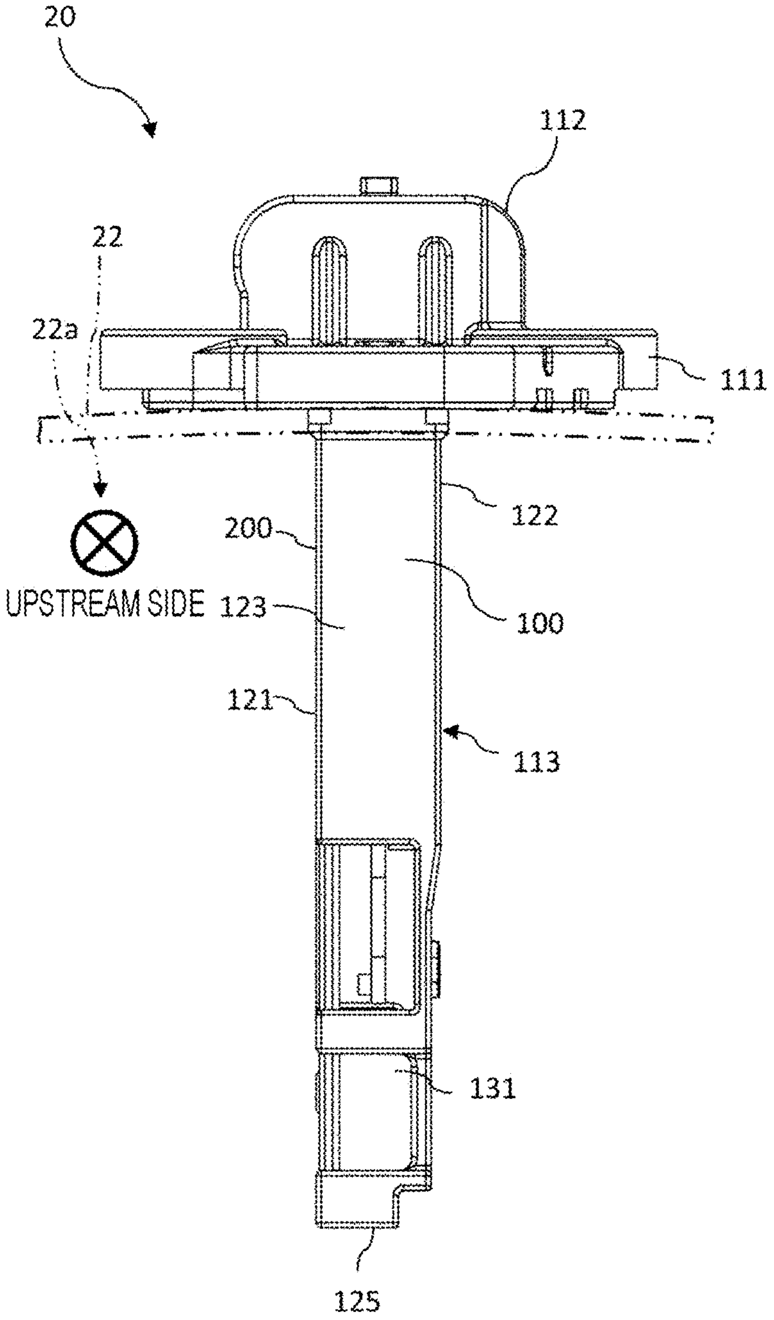
FIG. 2 is a front view of the physical quantity detection device according to the first embodiment.
Figure 3:
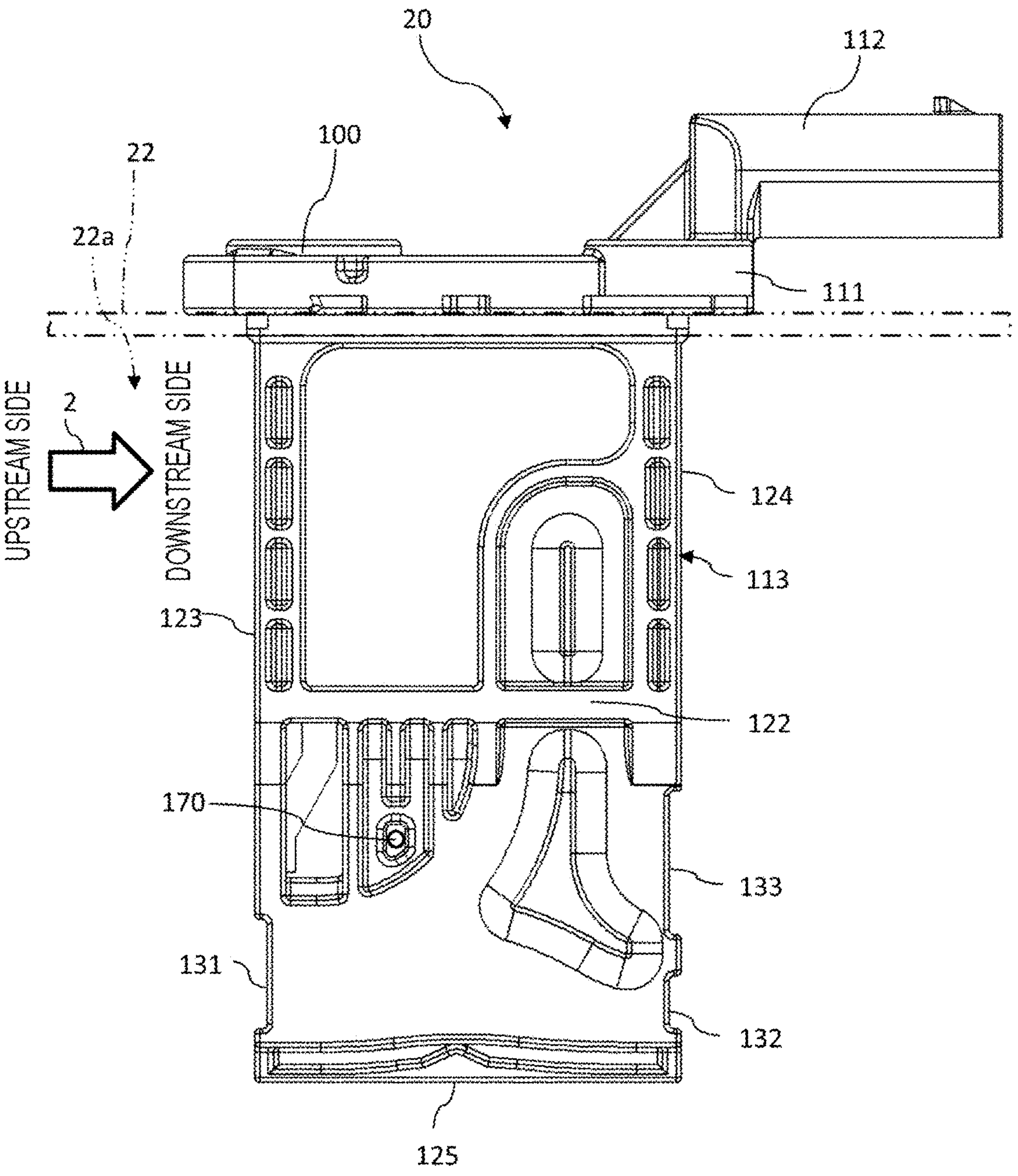
FIG. 3 is a right side view of the physical quantity detection device according to the first embodiment.
Figure 4:
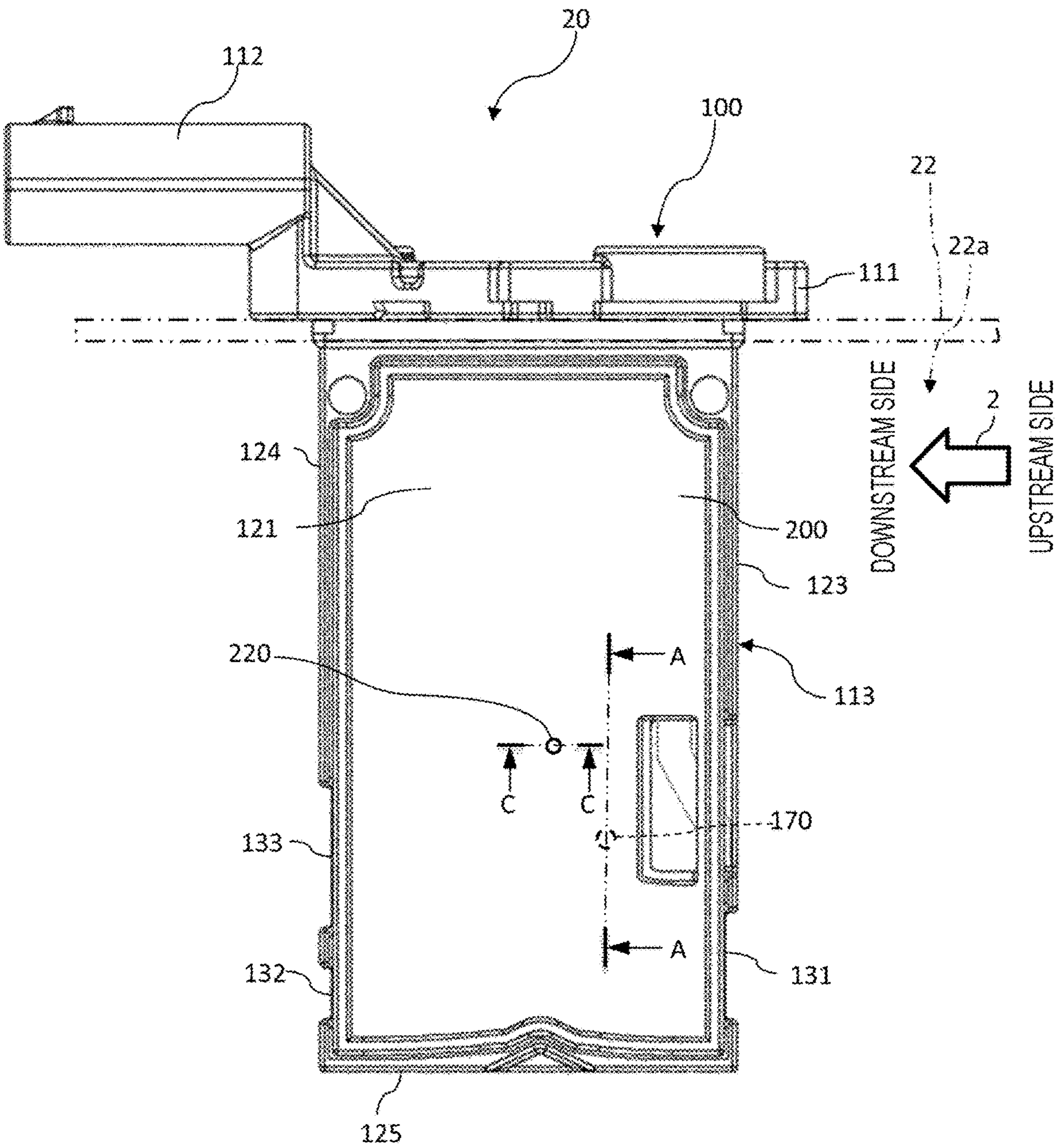
FIG. 4 is a left side view of the physical quantity detection device according to the first embodiment.
Figure 5:
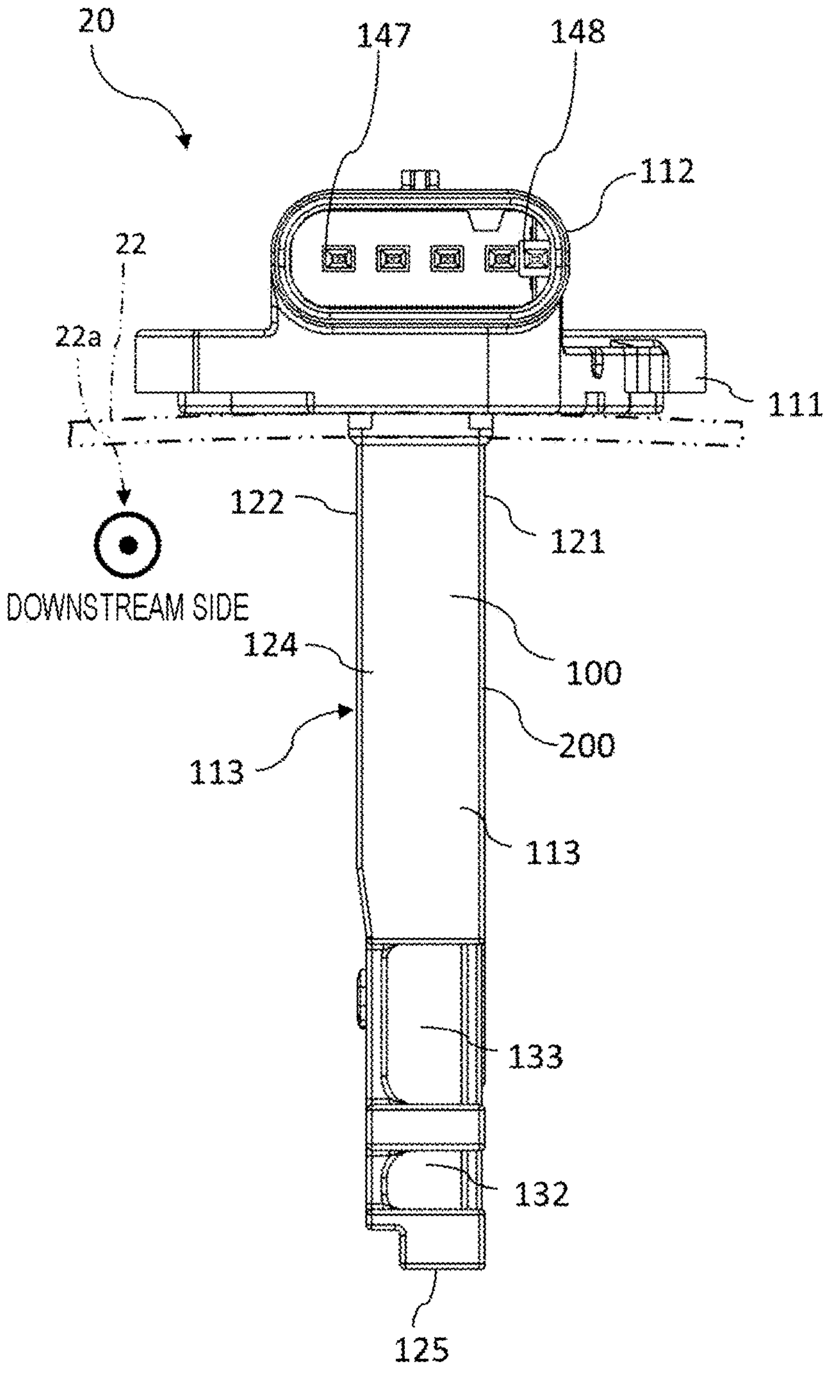
FIG. 5 is a rear view of the physical quantity detection device according to the first embodiment.
Figure 6:
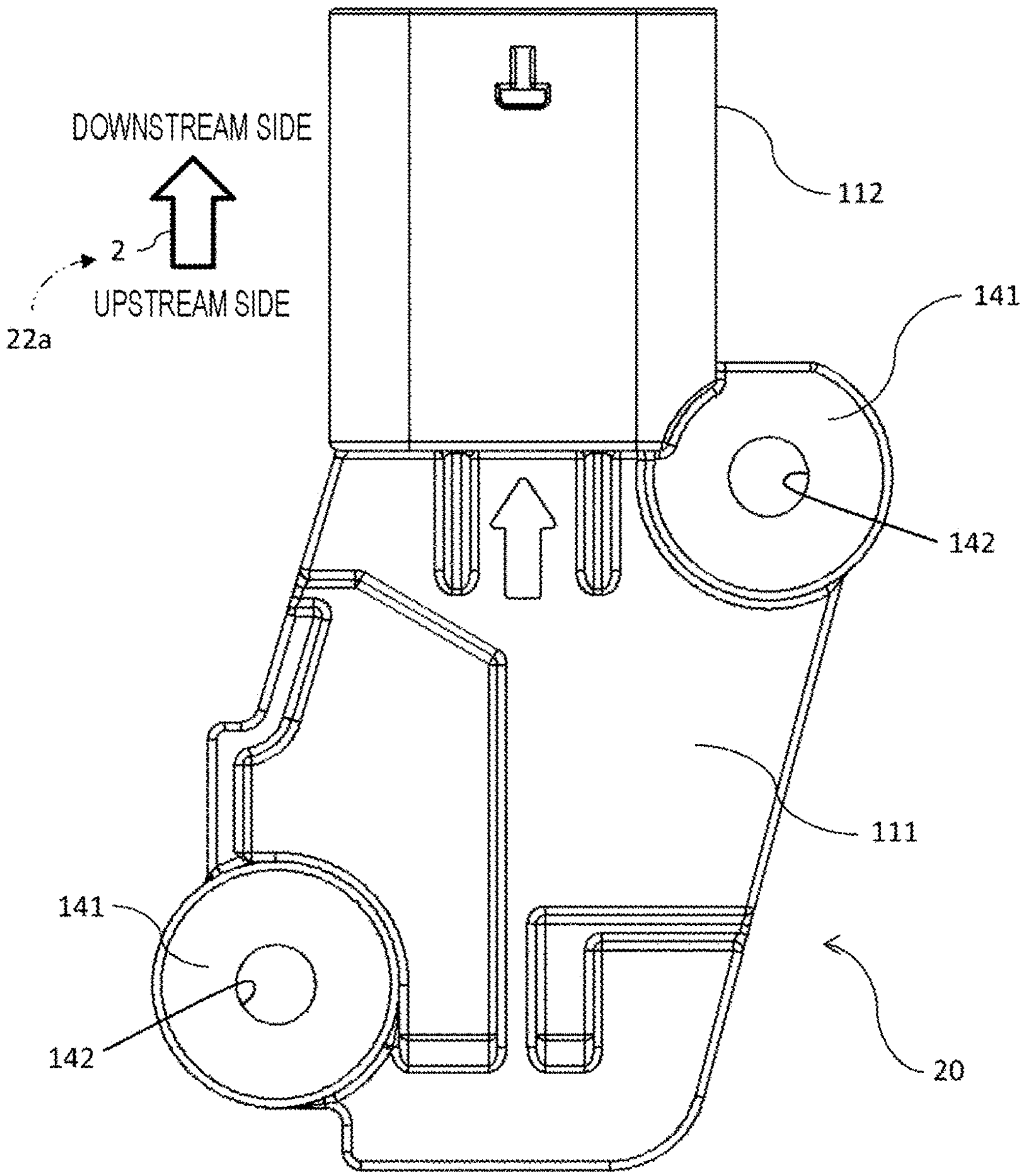
FIG. 6 is a plan view of the physical quantity detection device according to the first embodiment.
Figure 7:
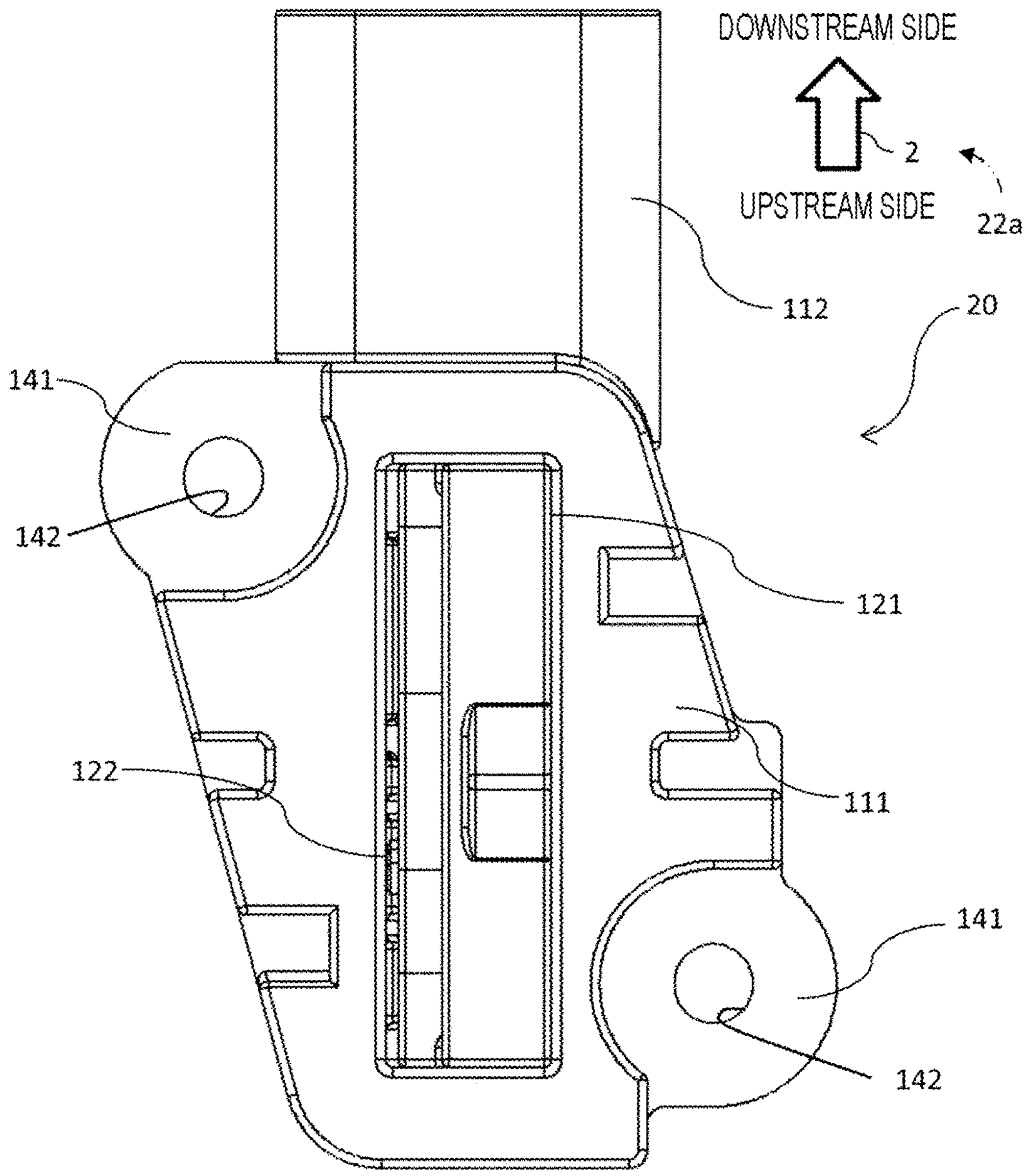
FIG. 7 is a bottom view of the physical quantity detection device according to the first embodiment.

FIG. 2 is a front view of the physical quantity detection device 20 according to the present embodiment. FIG. 3 is a right side view of the physical quantity detection device 20 according to the present embodiment. FIG. 4 is a left side view of the physical quantity detection device according to the present embodiment. FIG. 5 is a rear view of the physical quantity detection device according to the present embodiment. FIG. 6 is a plan view of the physical quantity detection device according to the present embodiment. FIG. 7 is a bottom view of the physical quantity detection device according to the present embodiment. Hereinafter, the measurement target gas 2 flows in the main flow path 22*a* in one direction of the arrow, and a description will be given taking an upstream side and a downstream side with reference to the direction of the arrow.

The physical quantity detection device 20 includes: a flange 111 that is a portion to be fixed to the intake body 22; a connector 112 that is a portion to be electrically connected to an external device; and a measurement unit 113 that is a portion to measure a physical quantity of the measurement target gas 2.

The flange 111 is, for example, a plate-like portion having a predetermined plate thickness and a substantially rectangular shape in plan view, and as shown in FIGS. 6 and 7, fixing hole portions 141 are provided in pairs at diagonal corners. A through hole 142 is provided at the center of the fixing hole portion 141, and the physical quantity detection device 20 is fixed to the intake body 22 by a screw inserted into the through hole 142.

As illustrated in FIG. 5, the connector 112 is provided on the flange 111, and includes, for example, a plurality of (in the present embodiment, four) external input-output terminals 147 and a correction terminal 148. Each of the plurality of external input-output terminals 147 includes a terminal for outputting a physical quantity such as a flow rate or a temperature, which is a measurement result of the physical quantity detection device 20, and a power supply terminal for supplying direct-current (DC) power for the operation of the physical quantity detection device 20. The correction terminal 148 is a terminal used to store a correction value in the physical quantity detection device 20. Note that the correction terminal 148 has a shape that does not interfere with the connection of the external input-output terminal 147. For example, the correction terminal 148 is shorter than the external input-output terminal 147 so as not to hinder the connection of the external input-output terminal 147.

The measurement unit 113 is provided below the flange 111 and has a wide left side surface 121 and right side surface 122, and a narrow front surface 123, back surface 124, and bottom surface 125. The measurement unit 113 is inserted into the main flow path 22*a* from a through hole provided in the intake body 22 and is disposed in the main flow path 22*a*. In the measurement unit 113 fixed in the main flow path 22*a*, the left side surface 121 and the right side surface 122 are arranged along the flowing direction of the measurement target gas 2 with respect to the main flow path 22*a*, the front surface 123 is disposed on the upstream side, and the back surface 124 is disposed on the downstream side.

As illustrated in FIG. 2, a sub-flow path inlet 131 is provided on the bottom surface 125 side of the front surface 123 of the measurement unit 113. As illustrated in FIG. 5, the back surface 124 of the measurement unit 113 is provided with a first outlet 132 on the bottom surface 125 side, and a second outlet 133 immediately above the first outlet 132. Note that the total opening area of the first outlet 132 and the second outlet 133 is larger than the opening area of the sub-flow path inlet 131. As a result, it is possible to inhibit the measurement target gas 2 from staying in the measurement unit 113. In addition, since the opening area of the first outlet 132 is smaller than the opening area of the second outlet 133, it is possible to inhibit the measurement target gas 2, flowing in through the sub-flow path inlet 131, from flowing out only through the first outlet 132 and not flowing out through the second outlet 133.

The measurement target gas 2 flowing near the center of the intake body 22 is taken into a sub-flow path 134 from the sub-flow path inlet 131 and flows out to the main flow path 22*a* from the first outlet 132 and the second outlet 133. At this time, with the sub-flow path inlet 131 being provided on the bottom surface 125 side, the physical quantity detection device 20 can measure the physical quantity of the measurement target gas 2 flowing in a portion away from the intake body 22. This can inhibit a decrease in measurement accuracy due to the influence of heat dissipation from the main flow path 22*a* or the like.

As illustrated in FIGS. 2 to 5, the distance between the left side surface 121 and the right side surface 122 is shorter than the distance between the front surface 123 and the back surface 124. This enables the physical quantity detection device 20 to suppress the resistance force due to the measurement target gas 2.

Figure 8:
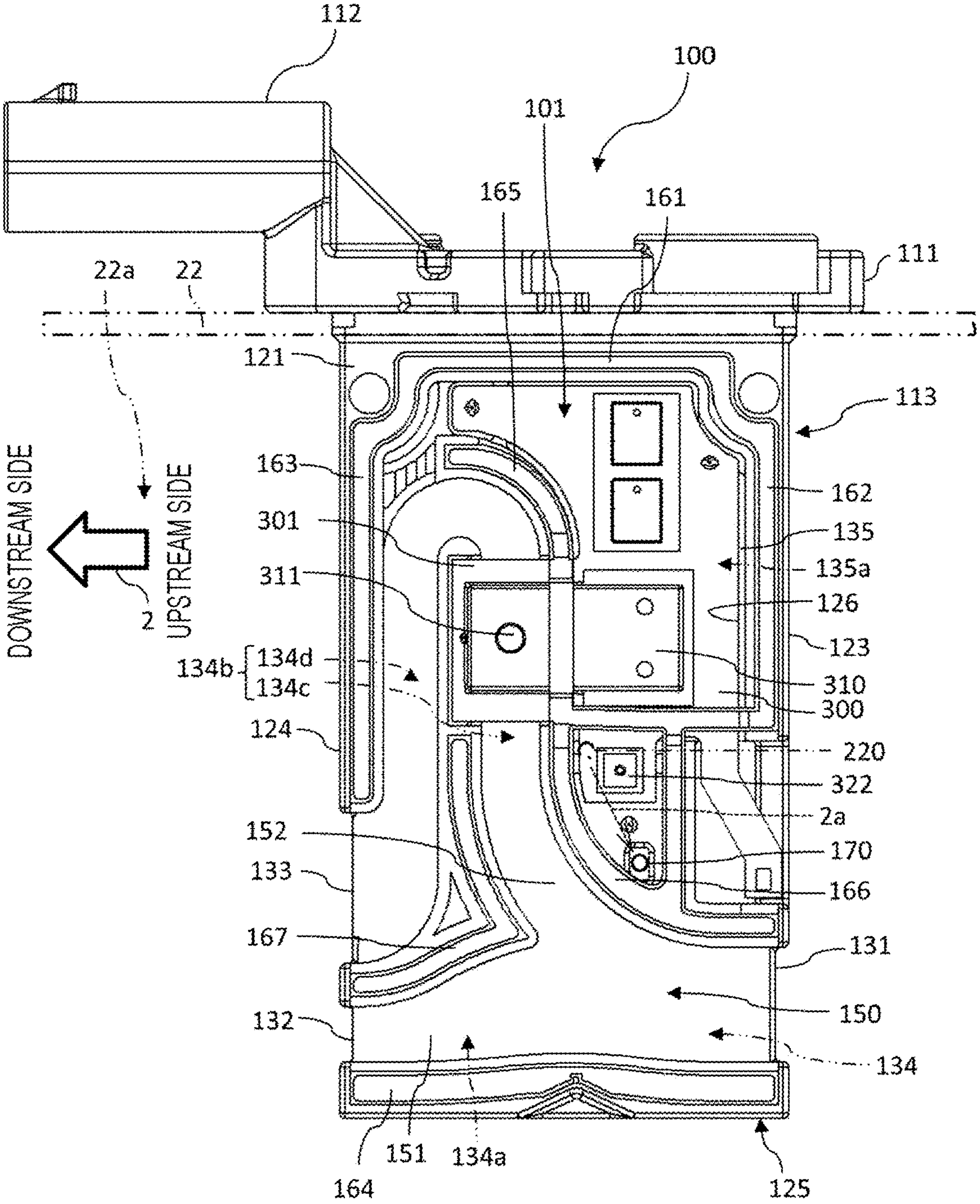
FIG. 8 is a left side view of the physical quantity detection device in a state where a cover has been removed from a housing in the physical quantity detection device according to the first embodiment.

FIG. 8 is a left side view of the physical quantity detection device 20 in a state where a cover 200 has been removed from a housing 100 in the physical quantity detection device 20 according to the present embodiment. As illustrated in FIG. 8, the housing 100 is provided with a sub-flow path groove 150 that communicates the sub-flow path inlet 131 with the first outlet 132 and the second outlet 133, and a recess 135 that accommodates the circuit board 300 and is fixed to a bottom surface 135*b* (see FIG. 13 to be described later).

The sub-flow path groove 150 is a groove for allowing the measurement target gas 2 to pass through the measurement unit 113 for the detection of the physical quantity. The sub-flow path groove 150 includes a first sub-flow path groove 151 that communicates the sub-flow path inlet 131 with the first outlet 132, and a second sub-flow path groove 152 that branches from the first sub-flow path groove 151, diverts upward, bends downward, and communicates with the second outlet 133.

The recess 135 is a recess provided in a region above the sub-flow path inlet 131 and in front of the second sub-flow path groove 152 in the housing 100. In the recess 135, a circuit board 300, which is electrically connected to an external input-output terminal through, for example, a bonding pad and bonding wire, is fixed to the bottom surface 135*b*.

Figure 9:
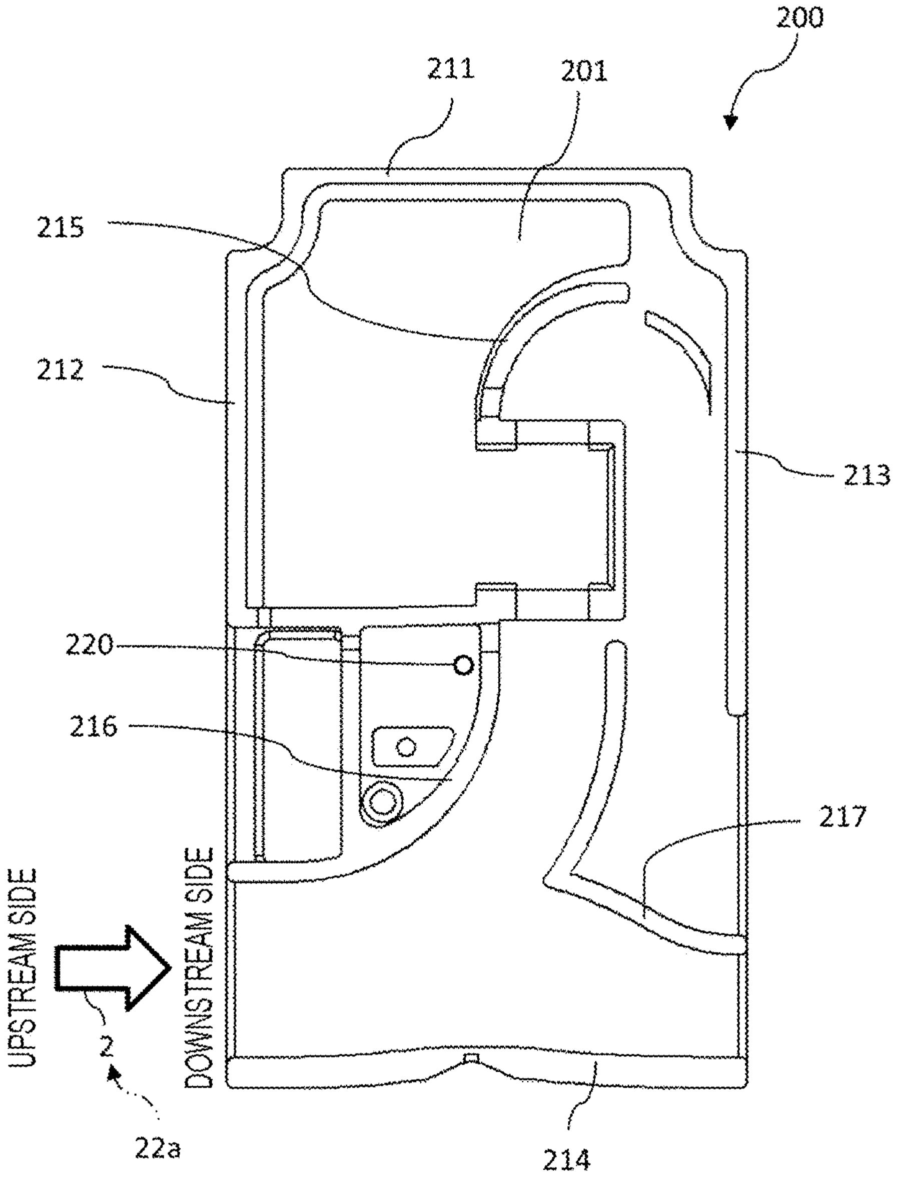
FIG. 9 is a front view of the surface of the cover removed from the housing, the surface facing the housing, in the physical quantity detection device according to the first embodiment.

FIG. 9 is a front view of the surface of the cover 200 removed from the housing 100, the surface facing the housing 100, in the physical quantity detection device 20 according to the present embodiment. The cover 200 is a member that closes an opening 101 (see FIG. 8) of the housing 100 and is formed of, for example, a flat plate. As illustrated in FIG. 9, the cover 200 is provided with ribs 211 to 217 that are elongated protrusions projecting from an inner side surface 201 toward the facing housing 100, and an inflow hole 220 to be described later.

The ribs 211 to 217 are inserted into recessed grooves 161 to 167 (see FIG. 8) provided in a peripheral wall 126, which surrounds the sub-flow path groove 150 and the recess 135 of the housing 100 and partitions the inside and outside thereof, and are bonded using an adhesive. Thereby, the cover 200 is fixed to the housing 100. Note that the cover 200 can be fixed to the housing 100 without providing the ribs 211 to 217 on the cover 200. In this case, the recessed grooves 161 to 167 are not provided in the peripheral wall 126 of the housing 100, and for example, the end of the peripheral wall 126 is adhered to the inner side surface 201 of the cover 200 to fix the cover 200 to the housing 100.

By attaching the cover 200 to the housing 100, the sub-flow path groove 150 of the housing 100 forms the sub-flow path 134. The first sub-flow path groove 151 and the second sub-flow path groove 152 included in the sub-flow path groove 150 form a first sub-flow path 134*a* and a second sub-flow path 134*b*, respectively.

The first sub-flow path 134*a* is a flow path that communicates the sub-flow path inlet 131 with the first outlet 132. The first sub-flow path 134*a* takes in the measurement target gas 2 flowing through the main flow path 22*a* from the sub-flow path inlet 131, allows the passage of the measurement target gas 2, and returns the measurement target gas 2 to the main flow path 22*a* from the first outlet 132.

The second sub-flow path 134*b* is a flow path that communicates the first sub-flow path 134*a* with the second outlet 133. The second sub-flow path 134*b* takes in the measurement target gas 2 flowing through the first sub-flow path 134*a*, allows the passage of the measurement target gas, and returns the measurement target gas 2 to the main flow path 22*a* from the second outlet 133. The second sub-flow path 134*b* is provided with a forward flow path portion 134*c* that branches off in the middle of the first sub-flow path 134*a* and extends toward the flange 111 on the upper side, and a return flow path portion 134*d* that makes a U-turn at the upper portion of the measurement unit 113 and extends toward the tip on the lower side and communicates with the second outlet 133.

A flow rate sensor (flow rate detection unit) 311 is disposed in the forward flow path portion 134*c* of the second sub-flow path 134*b*. The second sub-flow path 134*b* has a long flow path due to being diverted upward, making a U-turn, and communicating with the lower second outlet 133, and can reduce the influence of pulsation of the measurement target gas 2 on the flow rate sensor 311. The flow rate sensor 311 is provided at the tip of a chip package 310 projecting into the second sub-flow path groove 152, the chip package 310 being fixed to the circuit board 300.

By attaching the cover 200 to the housing 100, the recess 135 of the housing 100 forms a circuit chamber 135*a* together with the cover 200. The circuit chamber 135*a* accommodates the circuit board 300 by covering the circuit board 300 fixed to a bottom surface 135*b* of the recess 135 with the cover 200. A sensor 322, such as a pressure sensor, a temperature sensor, or a humidity sensor, is mounted on the circuit board 300 accommodated in the circuit chamber 135*a*.

The circuit chamber 135*a* is provided with an inflow hole 220 and an outflow hole 170 for allowing the measurement target gas 2 flowing through the main flow path 22*a* to pass through the circuit chamber 135*a* so that the sensor 322 disposed in the circuit chamber 135*a* detects the physical quantity of the measurement target gas 2.

The inflow hole 220 is a hole that communicates the main flow path 22*a* with the circuit chamber 135*a* and allows the measurement target gas 2 flowing through the main flow path 22*a* to flow into the circuit chamber 135*a*. In the present embodiment, the inflow hole 220 is provided in the left side surface 121 of the measurement unit 113 (that is, the cover 200). Note that the inflow hole 220 may be provided in the right side surface 122 of the measurement unit 113 (that is, the housing 100).

The outflow hole 170 is a hole that communicates the main flow path 22*a* with the circuit chamber 135*a* and allows the measurement target gas 2 in the circuit chamber 135*a* to flow out to the main flow path 22*a*. In the present embodiment, the outflow hole 170 is provided in the right side surface 122 of the measurement unit 113 (that is, the housing 100). Note that the outflow hole 170 may be provided in the left side surface 121 of the measurement unit 113 (that is, the cover 200).

As illustrated in FIG. 8, the sensor 322 is disposed in the circuit chamber 135*a* to be at least partially located on the path 2*a* of the measurement target gas 2 flowing from the inflow hole 220 to the outflow hole 170. Note that the sensor 322 is preferably disposed at a position away from the peripheral wall 126 in the circuit chamber 135*a*.

In the present embodiment, the sensor 322 is preferably a humidity sensor. The humidity sensor is attached to the circuit board 300 to be at least partially located on the path 2*a*. This enables the physical quantity detection device 20 to detect the humidity of the measurement target gas 2 flowing through the path 2*a*. A capacitive sensor is preferably used for the humidity sensor to perform detection with high accuracy. Note that a resistance sensor may be used to reduce costs.

With the physical quantity detection device 20 disposed in the main flow path 22*a*, when the upstream side and the downstream side are defined with reference to the flow of the measurement target gas 2 flowing in one direction in the main flow path 22*a*, the inflow hole 220 is preferably located on the downstream side of the outflow hole 170 as illustrated in FIG. 8.

Figure 10:
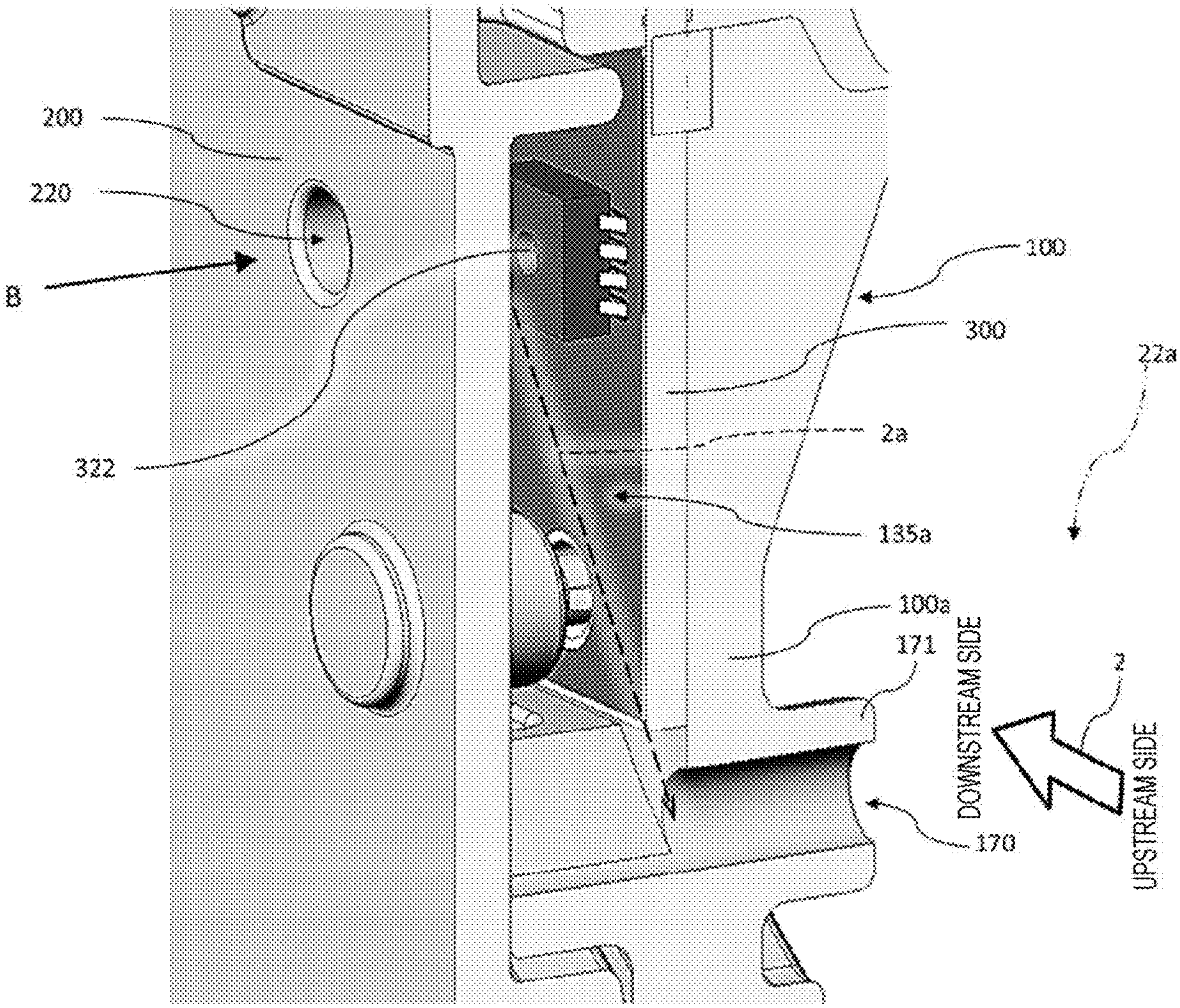
FIG. 10 is a cross-sectional perspective view taken along line A-A in FIG. 4.

FIG. 10 is a cross-sectional perspective view taken along line A-A in FIG. 4. As shown in FIG. 10, the outflow hole 170 is preferably provided in a projection 171 projecting to the main flow path 22*a* from the side wall 100*a* of the housing 100 that covers the circuit chamber 135*a* from the main flow path 22*a* side. In this way, when the outflow hole 170 is provided in the projection 171, the separation of the measurement target gas 2 occurs near the outflow hole 170, making the pressure near the outflow hole 170 lower than the pressure near the inflow hole 220. This facilitates the flow of the measurement target gas 2 in the circuit chamber 135*a* from the inflow hole 220 located on the downstream side of the main flow path 22*a* toward the outflow hole 170 located on the upstream side.

Figure 11:
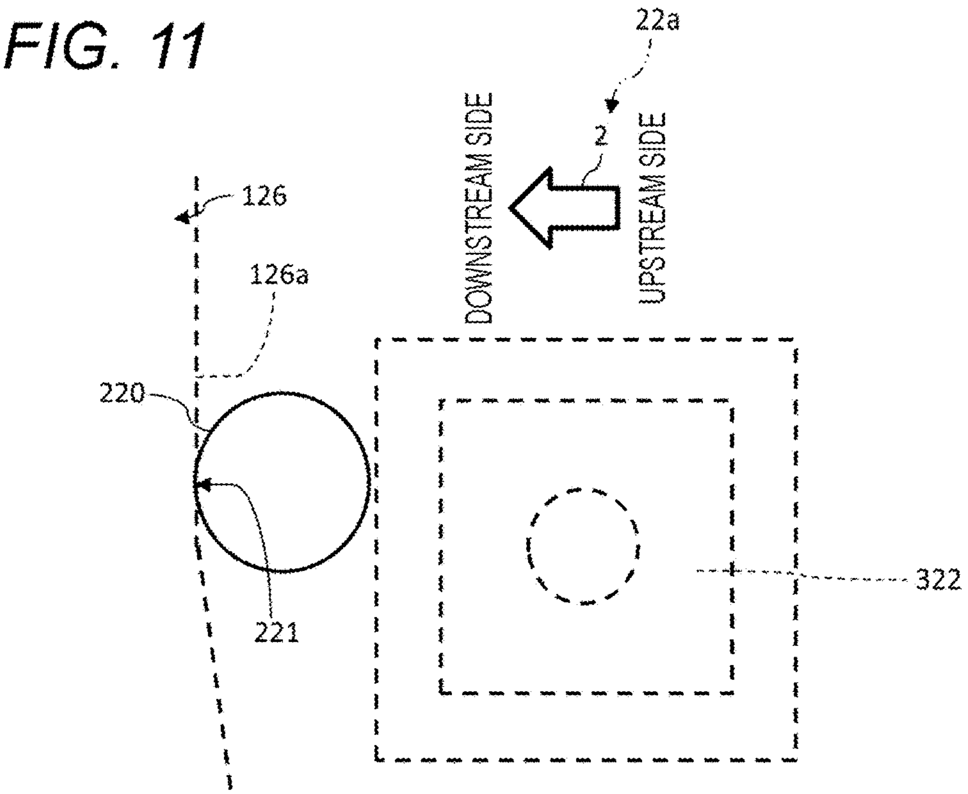
FIG. 11 is a view taken in the direction of arrow B in FIG. 10.
Figure 12:
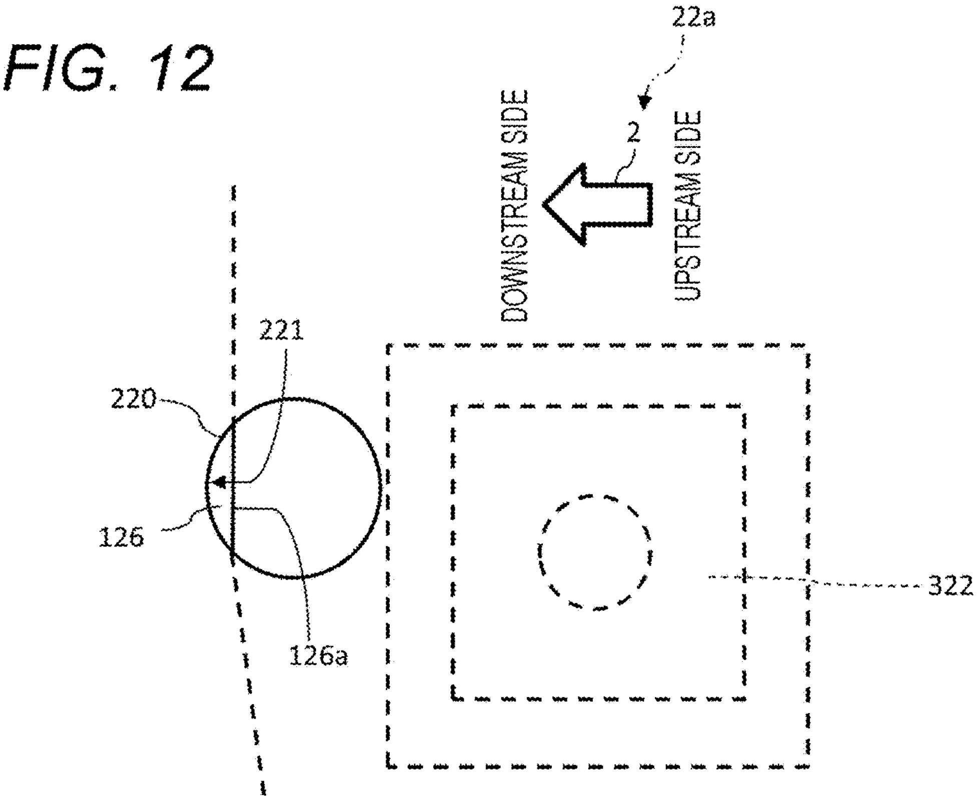
FIG. 12 is a view taken in the direction of arrow B in FIG. 10.
Figure 13:
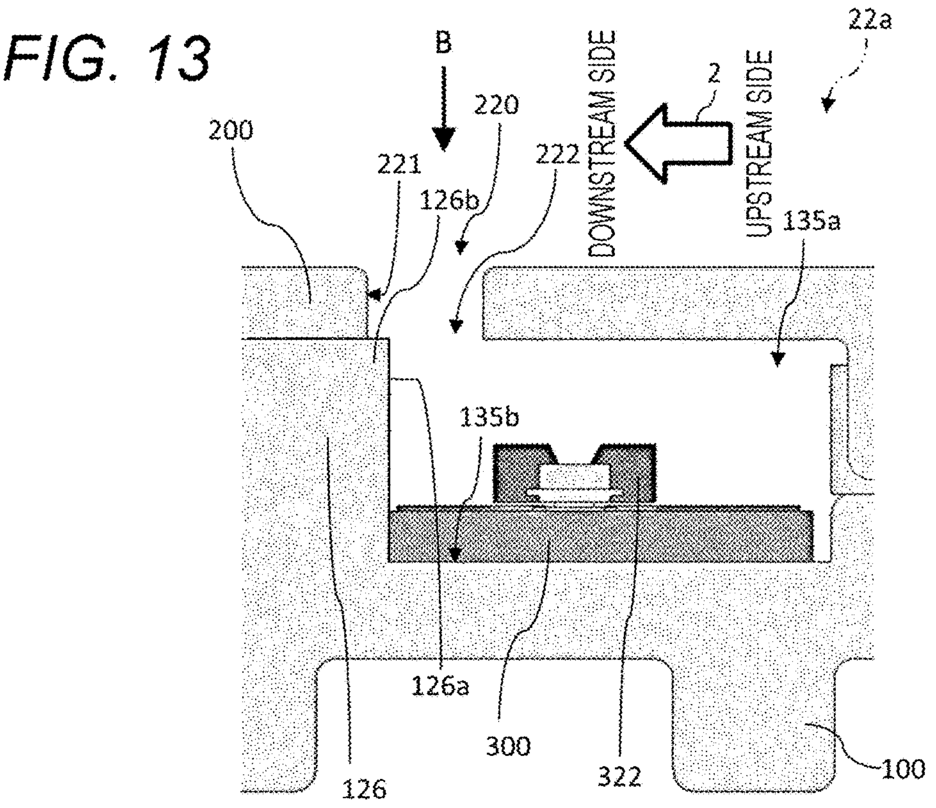
FIG. 13 is a cross-sectional view taken along line C-C in FIG. 4.
Figure 14:
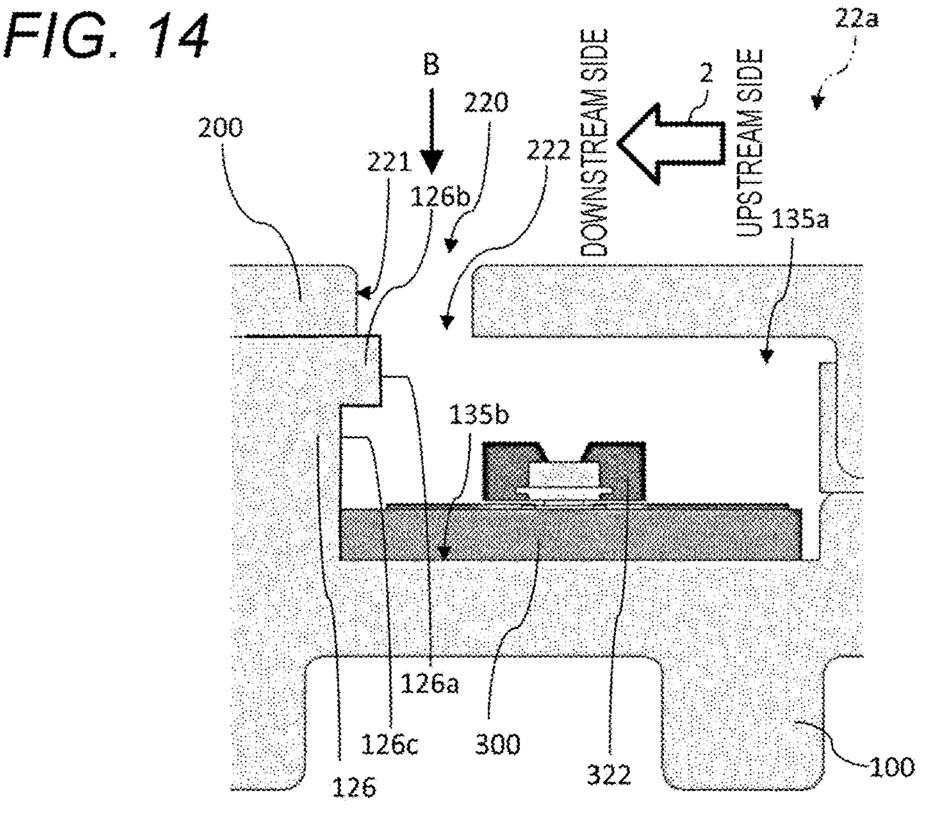
FIG. 14 is a cross-sectional view taken along line C-C in FIG. 4.

FIGS. 11 and 12 are views taken in the direction of arrow B in FIG. 10, and FIGS. 13 and 14 are cross-sectional views taken along line CC in FIG. 4. In the physical quantity detection device 20, when the inflow hole 220 is viewed from the main flow path 22*a* side (B side in FIG. 10), a portion (most downstream portion) 221 located on the most downstream side in the inflow hole 220 preferably has one of the features illustrated in FIGS. 11 and 12. That is, as illustrated in FIG. 11, the most downstream portion 221 is preferably located at the same position as a wall surface on the downstream side (downstream wall surface) forming the circuit chamber 135*a*. Alternatively, as illustrated in FIG. 12, the most downstream portion 221 is preferably located on the downstream side of the downstream wall surface 126*a*. When the inflow hole 220 has the above feature, the present invention is not limited to the case where the inflow hole 220 is located on the downstream side of the outflow hole 170.

In particular, in the physical quantity detection device 20, when the inflow hole 220 is viewed from the main flow path 22*a* side (B side in FIG. 10), the wall surface 126*a* of the circuit chamber is visible on the downstream side inside the inflow hole 220 as illustrated in FIG. 12. The wall surface 126*a* of the circuit chamber preferably has at least one protrusion 126*b* on the downstream side inside the inflow hole 220.

Further, in the physical quantity detection device 20, as illustrated in FIGS. 13 and 14, the wall surface 126*a* of the circuit chamber 135*a* preferably covers a part 222*a* on the downstream side of an outlet 222 of the inflow hole 220. Note that the wall surface 126*a* only needs to cover a part 222*a* on the downstream side of the outlet 222 of the inflow hole 220. Therefore, as shown in FIG. 13, the wall surface 126*a* may extend to the bottom surface 135*b*, and as shown in FIG. 14, a wall surface 126*c* provided below the wall surface 126*a* and on the downstream side of the wall surface 126*a* may extend to the bottom surface 135*b*.

Effects

In the present embodiment, the sensor 322 is provided to be at least partially located on the path for the measurement target gas 2 flowing from the inflow hole 220 to the outflow hole 170 in the circuit chamber 135*a*. That is, the measurement space of the sensor 322, provided in the second sub-flow path 134*b* in the past, is provided in the circuit chamber 135*a*. This enables the second sub-flow path 134*b* to be miniaturized and the physical quantity detection device 20 to be miniaturized.

Moreover, positioning a part of the sensor 322 on the path 2*a* of the measurement target gas 2 allows for the active flow of the measurement target gas 2 near the sensor 322, which can prompt the replacement of the measurement target gas 2, ensuring the responsiveness of the sensor 322. For example, when a humidity sensor is used as the sensor 322, the replacement of the measurement target gas 2 near the humidity sensor is promoted, so that the humidity of the measurement target gas 2 can be detected with high responsiveness.

In the physical quantity detection device 20 of the present embodiment, when the upstream side and the downstream side are defined with reference to the flow of the measurement target gas 2 flowing in one direction in the main flow path 22*a*, the inflow hole 220 is preferably located on the downstream side of the outflow hole 170. When the inflow hole 220 and the outflow hole 170 are disposed in this manner, the measurement target gas 2 in the circuit chamber 135*a* flows in the opposite direction from the downstream side to the upstream side with respect to the flow direction of the measurement target gas 2 flowing through the main flow path 22*a*. That is, the measurement target gas 2 flowing through the main flow path 22*a* enters the circuit chamber 135*a* from the inflow hole 220, makes a U-turn, and flows. When a U-turn is made in the flow of the measurement target gas 2 in this manner to intentionally hinder the smooth flow, it is possible to inhibit the entry of foreign matter (for example, water) into the circuit chamber 135*a* (that is, a large amount of foreign matter in the main flow path 22*a* flow toward the downstream side by inertia without entering the circuit chamber 135*a* from the inflow hole 220) and to reduce the amount of foreign matter reaching the sensor 322. Note that the flow velocity of the measurement target gas 2 in the circuit chamber 135*a* is lower than the flow velocity in the main flow path 22*a*, but the response time of the humidity sensor does not depend so much on the flow velocity, and hence the slower flow velocity does not cause a problem with the responsiveness.

On the upstream sides of the left side surface 121 and the right side surface 122 of the physical quantity detection device 20, there tends to be a generation of a vortex due to the measurement target gas 2 colliding with the front surface 123, which causes foreign matter to easily attach. However, by disposing the inflow hole 220 on the downstream side of the left side surface 121 or the right side surface 122 of the physical quantity detection device 20 as described above, the inflow hole 220 can be kept away from the upstream side to which the foreign matter is attached, and the amount of foreign matter reaching the sensor 322 can be reduced.

Figure 15:
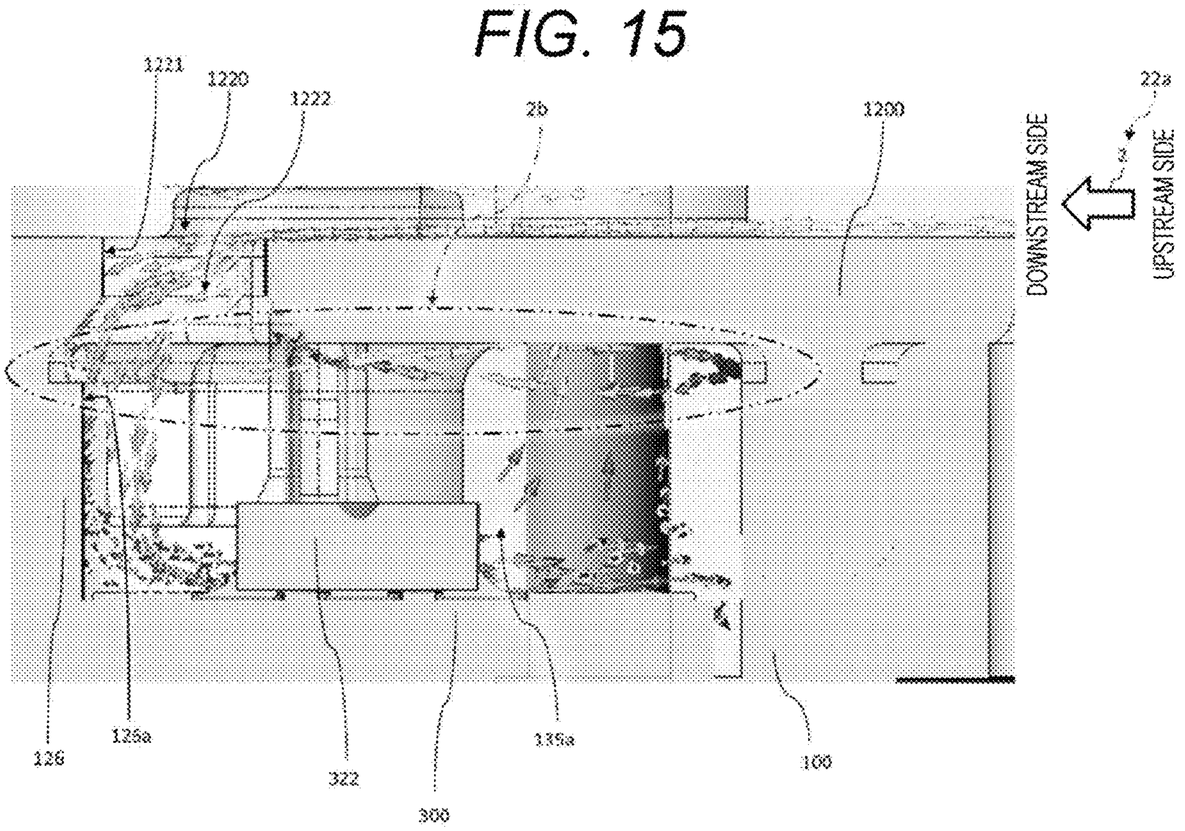
FIG. 15 is an analysis diagram illustrating the behavior of a measurement target gas having flowed in from an inflow hole in a physical quantity detection device according to a comparative example in which the inflow hole is disposed on the upstream side of the inflow hole of the present invention.
Figure 16:
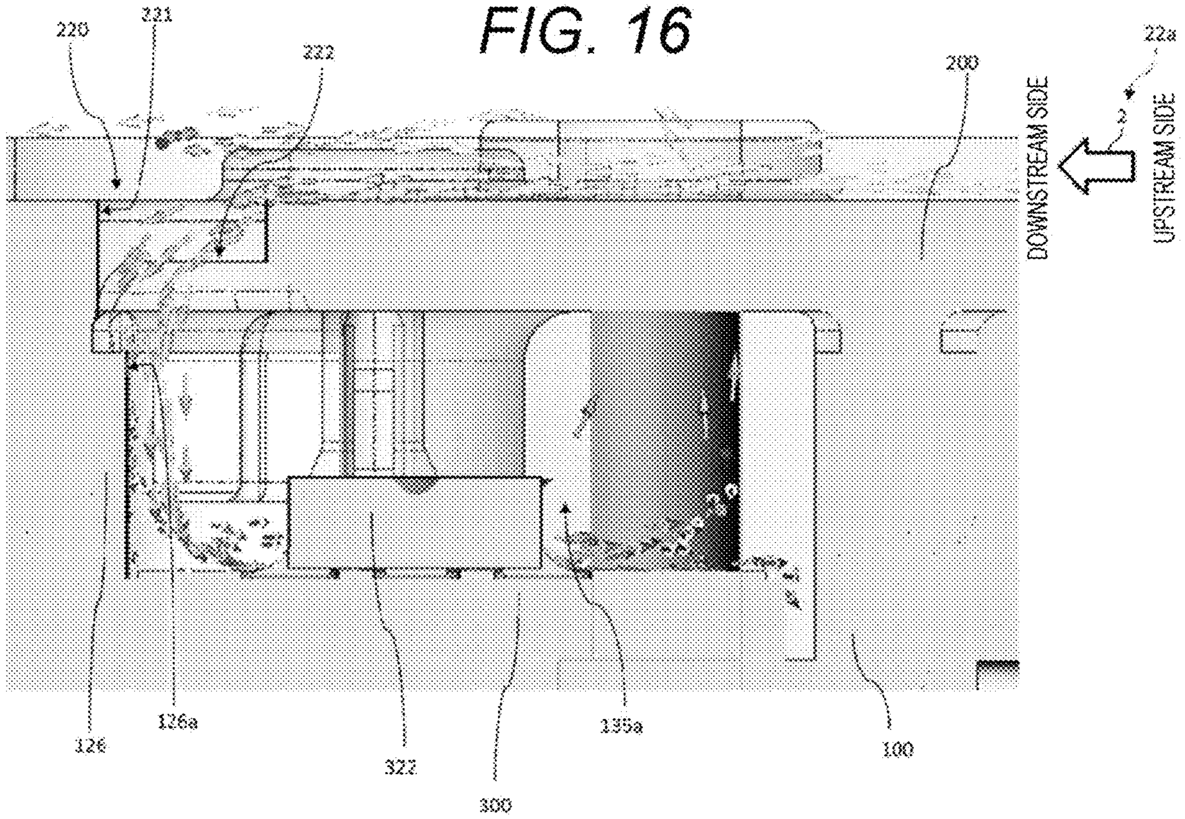
FIG. 16 is an analysis diagram illustrating the behavior of a measurement target gas having flowed in from an inflow hole in the physical quantity detection device according to the first embodiment.

FIG. 15 is an analysis diagram illustrating the behavior of the measurement target gas 2 having flowed in from an inflow hole 1220 in a physical quantity detection device according to a comparative example in which the inflow hole 1220 is disposed on the upstream side of the inflow hole 220 of the present invention. FIG. 16 is an analysis diagram illustrating the behavior of the measurement target gas 2 having flowed in from the inflow hole 220 of the physical quantity detection device 20 according to the present embodiment.

In the inflow hole 1220 of the physical quantity detection device according to the comparative example, a portion (most downstream portion) 1221 located on the most downstream side is located on the upstream side of a wall surface (downstream wall surface) 126*a* on the downstream side forming the circuit chamber 135*a*. In this case, the width of the flow path for the measurement target gas 2 rapidly increases when the measurement target gas 2 reaches the circuit chamber 135*a* through the inflow hole 1220. For example, the flow path for the measurement target gas 2 has a so-called enlarged tube shape, and the measurement target gas 2 discharged from an outlet 1222 of the inflow hole 1220 forms a vortex 2*b* as illustrated in FIG. 15. Since the vortex 2*b* causes turbulence in the flow of the measurement target gas 2 in the circuit chamber 135*a*, foreign matter easily stays in the circuit chamber 135*a*, and the foreign matter easily reaches the sensor 322.

To solve this problem, in the present embodiment, when the inflow hole 220 is viewed from the main flow path 22*a* side, the most downstream portion 221 is preferably located at the same position as the downstream wall surface (downstream wall surface) 126*a* forming the circuit chamber 135*a* as illustrated in FIG. 11, or the most downstream portion 221 is preferably located on the downstream side of the downstream wall surface 126*a* as illustrated in FIG. 12. In this case, since the downstream wall surface 126*a* functions as the throttle of the flow path for the measurement target gas 2, as illustrated in FIG. 16, the flow velocity of the measurement target gas 2 having flowed into the circuit chamber 135*a* increases, and the generation of the vortex 2*b* can be inhibited. As a result, the measurement target gas 2 in the circuit chamber 135*a* can be actively discharged toward the outflow hole 170, so that the foreign matter is inhibited from staying in the circuit chamber 135*a*, and the foreign matter can be inhibited from reaching the sensor 322.

In particular, in the physical quantity detection device 20, when the inflow hole 220 is viewed from the main flow path 22*a* side (B side in FIG. 10), the wall surface 126*a* of the circuit chamber is visible on the downstream side inside the inflow hole 220 as illustrated in FIG. 12. The wall surface 126*a* of the circuit chamber preferably has at least one protrusion 126*b* on the downstream side inside the inflow hole 220. As a result, the protrusion 126*b* of the downstream wall surface 126*a* functions as the throttle of the flow path for the measurement target gas 2, the flow velocity of the measurement target gas 2 having flowed into the circuit chamber 135*a* further increases, and the generation of the vortex 2*b* can be inhibited. In addition, the measurement target gas 2 in the circuit chamber 135*a* can be actively discharged toward the outflow hole 170, so that the foreign matter is inhibited from staying in the circuit chamber 135*a*, and the foreign matter can be inhibited from reaching the sensor 322.

The measurement target gas 2 may contain water as foreign matter. As a result of analyzing the behavior of water in the circuit chamber 135*a*, the inventors have found that water gathers on the peripheral wall 126 of the circuit chamber 135*a*. When the sensor 322 is disposed at a position away from the peripheral wall 126 in the circuit chamber 135*a* as in the present embodiment, it is difficult for water to reach the sensor 322, thus facilitating accurate detection of the physical quantity of the measurement target gas 2.

Second Embodiment

Figure 17:
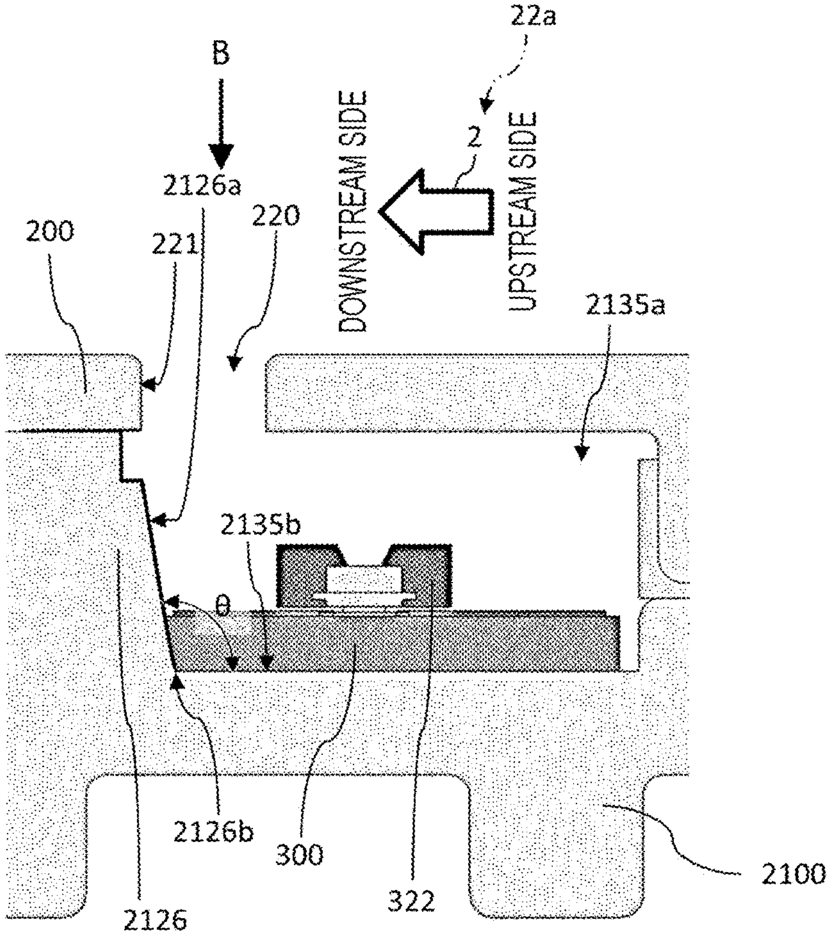
FIG. 17 is a cross-sectional view of a physical quantity detection device according to a second embodiment taken along line C-C illustrated in FIG. 4.

FIG. 17 is a cross-sectional view taken along line CC in FIG. 4 of a physical quantity detection device according to a second embodiment of the present invention. The physical quantity detection device according to the present embodiment differs from the physical quantity detection device 20 according to the first embodiment in the following point. That is, a downstream wall surface 2126*a* forming a circuit chamber 2135*a* is inclined to form an obtuse angle θ with a bottom surface 2135*b* of the circuit chamber 2135*a*, and when the inflow hole 220 is viewed from the main flow path side (B side), a portion (most downstream portion) 221 located on the most downstream side in the inflow hole 220 is located on the downstream side of an intersection line 2126*b* between a downstream wall surface 2126*a* and the bottom surface 2135*b* of the circuit chamber 2135*a*.

Effects

Since the downstream wall surface 2126*a* of the present embodiment functions as the throttle of the flow path for the measurement target gas 2 similarly to the downstream wall surface 126*a* of the first embodiment, the flow velocity of the measurement target gas 2 having flowed into the circuit chamber 2135*a* increases, and the generation of the vortex 2*b* can be inhibited. As a result, the measurement target gas 2 in the circuit chamber 2135*a* can be actively discharged toward the outflow hole 170, so that the foreign matter is inhibited from staying in the circuit chamber 2135*a*, and the foreign matter can be inhibited from reaching the sensor 322.

Third Embodiment

Figure 18:
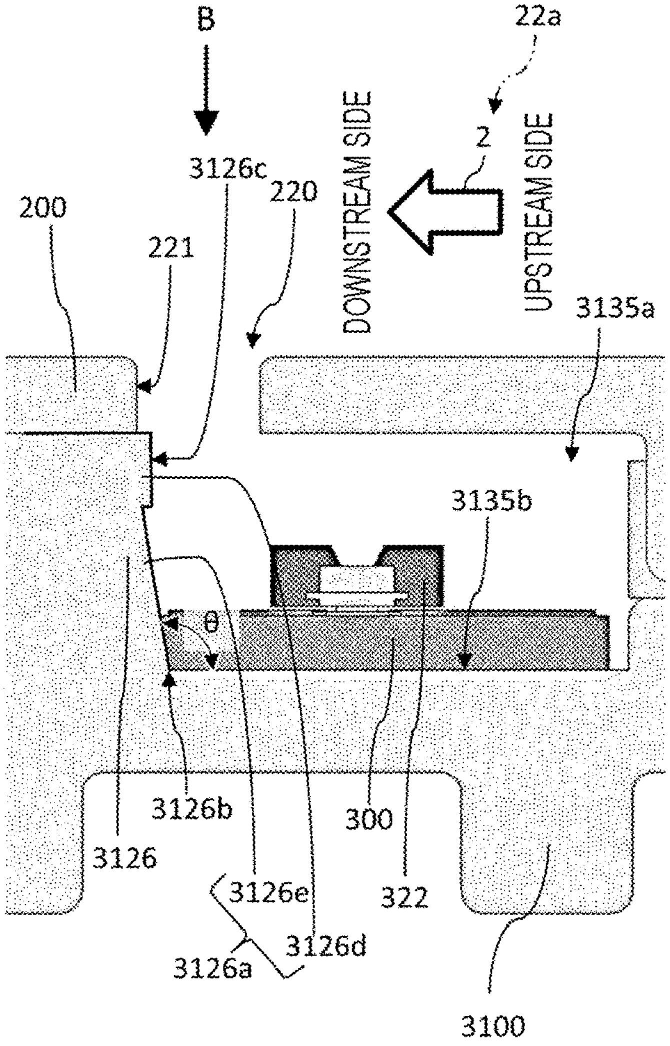
FIG. 18 is a cross-sectional view of a physical quantity detection device according to a third embodiment taken along line C-C illustrated in FIG. 4.

FIG. 18 is a cross-sectional view taken along line CC in FIG. 4 of a physical quantity detection device according to a third embodiment of the present invention. The physical quantity detection device according to the present embodiment differs from the physical quantity detection device according to the second embodiment in the following point. That is, a protrusion 3126*d* having an end face 3126*c* located on the downstream side of an intersection line 3126*b* is provided. In other words, when the inflow hole 220 is viewed from the main flow path side (B side), a wall surface 3126*a* of a circuit chamber 3135*a*, visible on the downstream side inside the inflow hole 220, includes a plurality of protrusions (in the present embodiment, protrusions 3126*d*, 3126*e*) in the height direction of the wall surface 3126*a*, and the protrusion including the end surface located on the most upstream side among the plurality of protrusions is the protrusion 3126*e* closest to a bottom surface 3135*b* of the circuit chamber 3125*a*.

Effects

Since the downstream wall surface **3126*a* functions as the throttle of the flow path for the measurement target gas 2 similarly to the downstream wall surface 126*a* of the first embodiment, the flow velocity of the measurement target gas 2 having flowed into the circuit chamber 3135*a* increases, and the generation of the vortex 2*b* can be inhibited. As a result, the measurement target gas 2 in the circuit chamber 3135*a* can be actively discharged toward the outflow hole 170, so that the foreign matter is inhibited from staying in the circuit chamber 3135*a*, and the foreign matter can be inhibited from reaching the sensor 322**.

Note that the present invention is not limited to the embodiments described above, and includes various modifications. For example, the above embodiments have been described in detail for easy understanding of the present invention, and are not necessarily limited to those including all the described configurations. A part of the configuration of one embodiment can be replaced with the configuration of another embodiment, and the configuration of another embodiment can be added to the configuration of one embodiment. It is possible to add, delete, and replace other configurations for a part of the configuration of each embodiment.

REFERENCE SIGNS LIST

- 2 measurement target gas
- **2*a*** path
- **2*b*** vortex
- 20 physical quantity detection device
- **22*a*** main flow path
- 100 housing
- 113 measurement unit
- 126 peripheral wall
- **126*a*, 2126*a*, 3126*a*** downstream wall surface
- **135*a*, 2135*a*, 3135*a*** circuit chamber
- **135*b*, 2135*b*, 3135*b*** bottom surface
- 170 outflow hole
- 171 projection
- 200 cover
- 220 inflow hole
- 221 most downstream portion
- 222 outlet
- 300 circuit board
- 322 sensor
- **2126*b*, 3126*b*** intersection line
- **3126*c*** end surface
- **3126*d*, 3126*e*** protrusion

The invention claimed is:

1. A physical quantity detection device configured to be disposed in a main flow path through which a measurement target gas flows in one direction, the physical quantity detection device comprising:

a circuit chamber that accommodates a circuit board;

an inflow hole that communicates the main flow path with the circuit chamber and allows a measurement target gas flowing through the main flow path to flow into the circuit chamber;

an outflow hole that communicates the main flow path with the circuit chamber and allows the measurement target gas in the circuit chamber to flow out to the main flow path; and a sensor disposed in the circuit chamber to be at least partially located on a path for the measurement target gas flowing from the inflow hole to the outflow hole, wherein:

in a state where the physical quantity detection device is disposed in the main flow path, when an upstream side and a downstream side are defined with reference to a flow of the measurement target gas flowing in one direction in the main flow path, the inflow hole is located on the downstream side of the outflow hole.

2. The physical quantity detection device according to claim 1, wherein the sensor is disposed at a position away from a peripheral wall in the circuit chamber.

3. The physical quantity detection device according to claim 1, wherein the downstream wall surface forming the circuit chamber is inclined to form an obtuse angle with a bottom surface of the circuit chamber, and when the inflow hole is viewed from a side of the main flow path, a portion located on a most downstream side in the inflow hole is located on the downstream side of an intersection line between the downstream wall surface forming the circuit chamber and the bottom surface of the circuit chamber.

4. The physical quantity detection device according to claim 3, wherein when the inflow hole is viewed from the side of the main flow path, the downstream wall surface forming the circuit chamber includes a protrusion that has an end surface located on the downstream side of the intersection line.

5. The physical quantity detection device according to claim 1, wherein when the inflow hole is viewed from a side of the main flow path, a wall surface of the circuit chamber is visible on the downstream side inside the inflow hole.

6. The physical quantity detection device according to claim 5, wherein the wall surface of the circuit chamber visible on the downstream side inside the inflow hole includes at least one protrusion.

7. The physical quantity detection device according to claim 5, wherein the wall surface of the circuit chamber visible on the downstream side inside the inflow hole include a plurality of protrusions in a height direction of the wall surface, and a protrusion including an end surface located on a most upstream side among the plurality of protrusions is a protrusion closest to a bottom surface of the circuit chamber.

8. The physical quantity detection device according to claim 5, wherein the wall surface of the circuit chamber covers a part on the downstream side of an outlet of the inflow hole.

9. The physical quantity detection device according to claim 1, wherein the outflow hole is provided in a projection projecting to the main flow path from a side wall that covers the circuit chamber from a side of the main flow path.

10. A physical quantity detection device configured to be disposed in a main flow path through which a measurement target gas flows in one direction, the physical quantity detection device comprising:

a circuit chamber that accommodates a circuit board;

an inflow hole that communicates the main flow path with the circuit chamber and allows a measurement target gas flowing through the main flow path to flow into the circuit chamber;

an outflow hole that communicates the main flow path with the circuit chamber and allows the measurement target gas in the circuit chamber to flow out to the main flow path; and a sensor disposed in the circuit chamber to be at least partially located on a path for the measurement target gas flowing from the inflow hole to the outflow hole, wherein:

in a state where the physical quantity detection device is disposed in the main flow path, when an upstream side and a downstream side are defined with reference to a flow of the measurement target gas flowing in one direction in the main flow path, and when the inflow hole is viewed from a side of the main flow path, a portion located on a most downstream side in the inflow hole is located at the same position as a downstream wall surface forming the circuit chamber, or is located on the downstream side of the downstream wall surface forming the circuit chamber.

* * * * *